United States Patent
Hagiwara et al.

(10) Patent No.: US 9,061,465 B2
(45) Date of Patent: Jun. 23, 2015

(54) POWDER RAPID PROTOTYPING APPARATUS AND POWDER RAPID PROTOTYPING METHOD

(71) Applicant: Aspect Inc., Inagi-shi, Tokyo (JP)

(72) Inventors: Masashi Hagiwara, Inagi (JP); Masahiro Sassa, Aichi (JP)

(73) Assignee: ASPECT INC., Tokyo (JP)

( * ) Notice: Subject to any disclaimer, the term of this patent is extended or adjusted under 35 U.S.C. 154(b) by 364 days.

(21) Appl. No.: 13/721,482

(22) Filed: Dec. 20, 2012

(65) Prior Publication Data
US 2014/0035205 A1 Feb. 6, 2014

(30) Foreign Application Priority Data
Jul. 31, 2012 (JP) ................. 2012-170097

(51) Int. Cl.
| | |
|---|---|
| B22F 3/105 | (2006.01) |
| B29C 35/00 | (2006.01) |
| B29C 35/08 | (2006.01) |
| B29C 67/00 | (2006.01) |
| B29C 35/02 | (2006.01) |
| B23K 26/14 | (2014.01) |
| B23K 26/34 | (2014.01) |

(52) U.S. Cl.
CPC ............ *B29C 67/0077* (2013.01); *B29C 35/00* (2013.01); *B23K 26/14* (2013.01); *B29C 35/08* (2013.01); *B29C 67/0051* (2013.01); *B23K 26/34* (2013.01); *B22F 3/105* (2013.01); *B29C 2035/0283* (2013.01)

(58) Field of Classification Search
CPC ......... B22F 3/105; B29C 35/00; B29C 35/08; B29C 2035/0283; B29C 67/00; B29C 67/0051; B23K 26/14; B23K 26/34
USPC ......... 419/30; 264/113, 308, 497; 425/174.4; 156/272.8, 62.2, 379.6, 497, 538; 219/121.16, 121.17, 121.65, 121.66, 219/121.85; 700/118–120, 166; 427/596, 427/597
See application file for complete search history.

(56) References Cited

U.S. PATENT DOCUMENTS

| | | | |
|---|---|---|---|
| 7,153,463 B2 * | 12/2006 | Leuterer et al. ............... 264/308 |
| 7,540,738 B2 | 6/2009 | Larsson |
| 8,414,281 B2 * | 4/2013 | Schleiss et al. ............ 425/174.4 |
| 2006/0192322 A1 * | 8/2006 | Abe et al. ...................... 264/497 |

FOREIGN PATENT DOCUMENTS

| | | |
|---|---|---|
| JP | 2006-509914 A1 | 3/2006 |
| JP | 2011-21218 A1 | 2/2011 |

* cited by examiner

*Primary Examiner* — Samuel M Heinrich
(74) *Attorney, Agent, or Firm* — Kratz, Quintos & Hanson, LLP

(57) ABSTRACT

A powder rapid prototyping apparatus includes a decompressable chamber, a thin layer forming section which supplies powder material from a powder material housing container provided in the chamber to form a thin layer of the powder material, an energy beam source for heating which outputs energy beam for heating which sinters or melts and models the thin layer of the powder material, and a control section which controls the modeling, wherein the control section exposes the powder material to the decompressed atmosphere before starting modeling, and houses the powder material in the powder material housing containers in a divided manner.

17 Claims, 12 Drawing Sheets

POWDER RAPID PROTOTYPING APPARATUS AND POWDER RAPID PROTOTYPING METHOD

CROSS-REFERENCE TO RELATED APPLICATION

This application is based on and claims priority of Japanese Patent Application No. 2012-170097 filed on Jul. 31, 2012, the entire contents of which are incorporated herein by reference.

FIELD

The present invention relates to a powder rapid prototyping apparatus and a powder rapid prototyping method. In the apparatus and method, a three-dimensional model is fabricated through selectively irradiating laser light or electron beam and other energy beam such as particle beam to a thin layer of powder material to thereby sinter or melt and then solidify the thin layer, and subsequently laminating the thin layers which has been sintered or melted and then solidified in multiple layers.

BACKGROUND

In recent years, the powder rapid prototyping apparatus and the powder rapid prototyping method have been researched and developed to fabricate a substitute item for a metal product, a prototype of a product which is placed in a high-temperature environment or in which higher strength is required, or parts of high-mix low volume production, etc.

Regarding metal powder materials, stainless steel or bronze steel has already become usable, and aluminum, titanium or the like is being researched and developed in order to further widen application.

Previously, there has been the following inconvenience regarding the metal powder materials. Specifically, oxygen or nitrogen is introduced into metal powder when the metal powder is exposed to air. Thereby, the metal powder is oxidized or nitrided, and thus a finished model becomes very fragile.

To solve this problem, the present inventors have developed a technology (Japanese Patent Laid-open No. 2011-021218) in which thin layers of metal powder is formed, and sintered or melted and then solidified in a decompressed atmosphere.

Although the technology described in the patent document above has solved, to a certain extent, the inconvenience that the metal powder is oxidized or nitrided and a finished model becomes very fragile, there are cases where even further improvement is required for some application.

Further, in the case of using the metal powder, another inconvenience caused by oxygen or nitrogen and an influence by water have also newly become a problem as described below, therefore further improvement is required together with the above cases.

(1) If water is contained in the metal powder, water vapor generated from water, or nitrogen or oxygen produced by decomposed water is introduced into the metal powder.

Further, energy of energy beam for heating use is mainly consumed for vaporizing water, and therefore, only the surface of particles melts to allow the particles to adhere to each other, and the surface of model becomes textured finish.

(2) Further, even in metal powder material that is left without being irradiated by energy beam after modeling, the composition purity is deteriorated due to oxidization or the like, and thus its reuse becomes difficult.

SUMMARY

According to one aspect of the embodiment discussed herein, a powder rapid prototyping apparatus includes a decompressable chamber, a thin layer forming section which supplies powder material from a powder material housing container provided inside the chamber and forms a thin layer of the powder material, an energy beam source for heating which outputs energy beam for heating which sinters or melts to model the thin layer of the powder material, and a control section which controls the modeling, in which the control section exposes the powder material to the decompressed atmosphere before starting modeling, and houses the powder material in the powder material housing containers in a divided manner.

According to another aspect of the embodiment discussed herein, the powder rapid prototyping method includes housing a powder material in a decompressed atmosphere or in inert gas atmosphere, supplying the powder material to form a thin layer of the powder material, sintering or melting and then solidifying the thin layer to model it, in which said powder material is exposed to a decompressed atmosphere before starting modeling, and housed in a divided manner.

The object and advantages of the invention will be realized and attained by means of the elements and combinations particularly pointed out in the claims.

It is to be understood that both the foregoing general description and the following detailed description are exemplary and explanatory and are not respective of the invention, as claimed.

DESCRIPTION OF EMBODIMENTS

Figure 1:
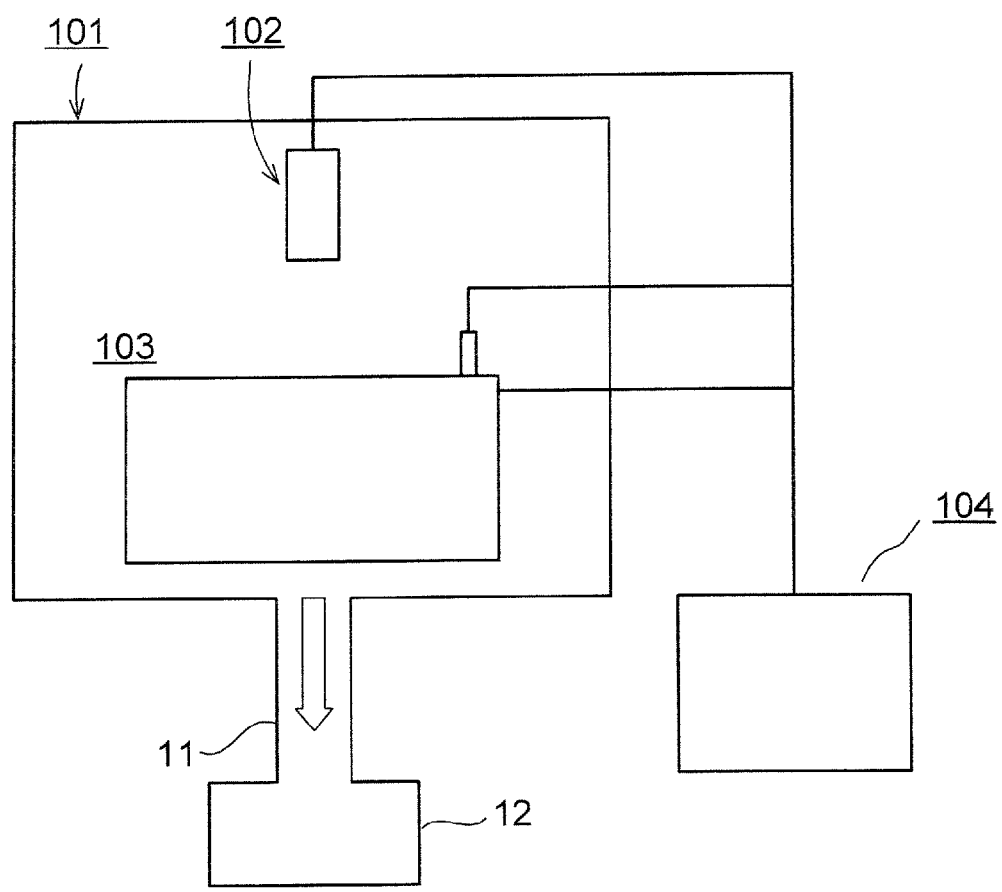
FIG. 1 is a view illustrating a constitution of the powder rapid prototyping apparatus according to an embodiment.

Hereinafter, the embodiment of the present invention will be explained referring to the drawings.

(1) Constitution of the Powder Rapid Prototyping Apparatus

FIG. 1 is a view illustrating the powder rapid prototyping apparatus according to the embodiment of the present invention.

Note that there are a laser light source that outputs laser light, an electron beam source that outputs electron beam, and other particle beam sources that output other particle beams as an energy beam source for heating use which outputs energy beam to perform modeling. In this embodiment, the laser light source is used.

The powder rapid prototyping apparatus is constituted of a decompressable chamber 101, a laser light outputting section 102 and a thin layer forming section 103 which are installed in the chamber 101, and a control section 104 installed outside the chamber 101. The decompressable chamber 101 includes an exhaust port 11 to which an exhaust device 12 is connected. Thin layers of powder material is formed in the thin layer forming section 103. Note that the laser light outputting section 102 may be installed outside the chamber 101. And in that case, a transmissive window for laser light is provided on the partition wall of the chamber 101.

The control section 104 of this powder rapid prototyping apparatus performs modeling control of forming the thin layers of powder material, and sintering or melting and then solidifying the layers by laser light. Further, before performing modeling, the control section 104 performs control of dividing the powder material by a small amount and exposing the material to a decompressed atmosphere to remove oxygen, nitrogen and water from the powder material being used. Because it is to even further suppress inconvenience which occurs due to oxygen, nitrogen and water in performing modeling. The invention according to this embodiment is particularly effective in the case where the powder material is a metal powder easily affected by oxygen, nitrogen and water.

Note that, hereinafter, the above-described action of "sintering or melting and then solidifying" will be expressed together as a "sintering" action to avoid redundant expression. A particular action of the actions will be clarified when necessary.

Details of each section of this powder rapid prototyping apparatus will be explained below.

(i) Constitution of the Laser Light Outputting Section 102

Figure 2:
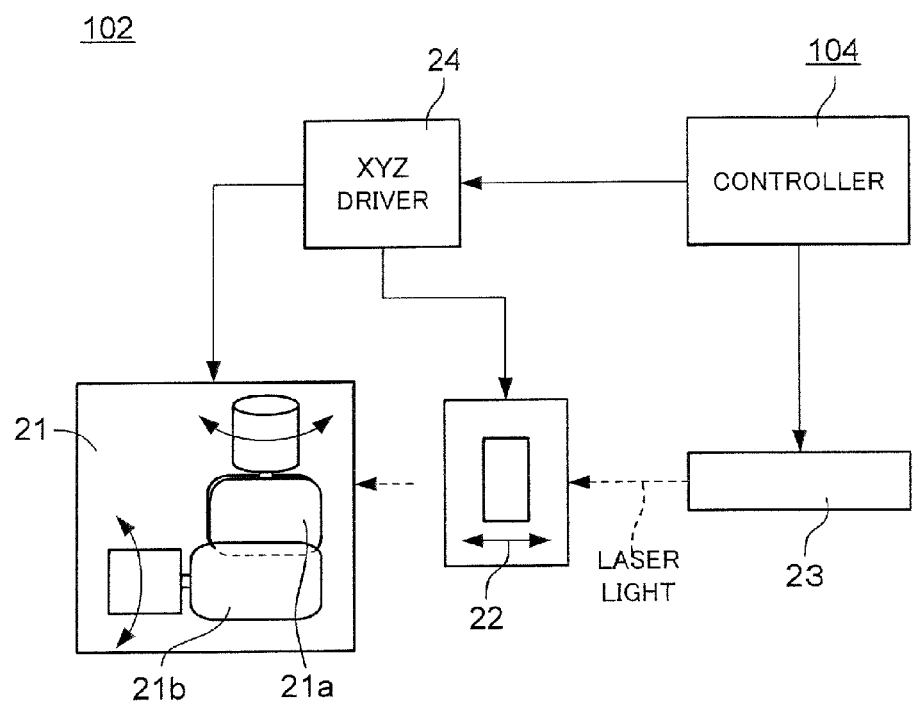
FIG. 2 is a view illustrating a laser light outputting section out of the powder rapid prototyping apparatus according to the embodiment.

FIG. 2 is a view illustrating the constitution of the laser light outputting section 102 out of the powder rapid prototyping apparatus according to the embodiment of the present invention.

The laser light outputting section 102 is equipped with a laser light source 23, the optical systems 21, 22 and an XYZ driver 24.

As the mainly applicable laser light source 23, there are a YAG laser light source, a fiber laser light source or the like which outputs laser light having a wavelength of about 1,000 nm. Alternatively, the wavelength can be appropriately changed in the case of taking not only wavelength absorptance of the powder material but also cost performance or the like in consideration. For example, a high-output $CO_2$ laser light source which outputs laser light having the wavelength of about wavelength 10,000 nm may be used.

The optical system 21 has a galvanometer mirror (X mirror) 21a and a galvanometer mirror (Y mirror) 21b, and the optical system 22 has a lens. The galvanometer mirrors (X mirror, Y mirror) 21a, 21b change an outputting angle of the laser light to scan the laser light in X direction and Y direction, respectively. Further, the lens moves in accordance with the movement of the laser light scanned in X direction and Y direction to thus match the focal length of the laser light with the surface of the thin layer of powder material.

The XYZ driver 24 sends out a control signal which allows the X mirror 21a, the Y mirror 21b and the lens to be operated by a control signal from the control section 104 (described later).

Now, in the case of using other energy beam sources instead of laser light as an energy beam source for heating use, an optical system can be changed appropriately corresponding to the energy beam source. For example, an electromagnetic lens and a polarizing system can be used in the case of an electron beam source.

(ii) Constitution of the Thin Layer Forming Section 103.

Figure 3A:
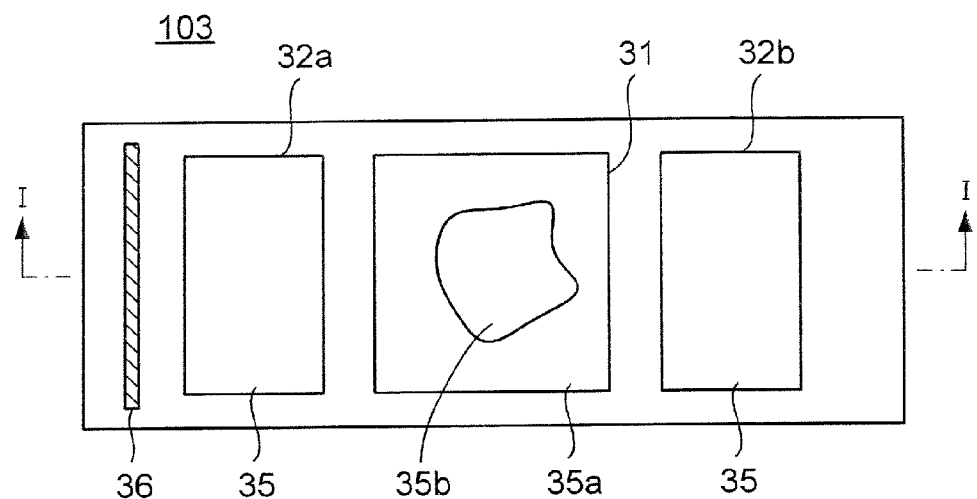
FIG. 3A is a top plan view illustrating a constitution of a thin layer forming section out of the powder rapid prototyping apparatus according to the embodiment.
Figure 3B:
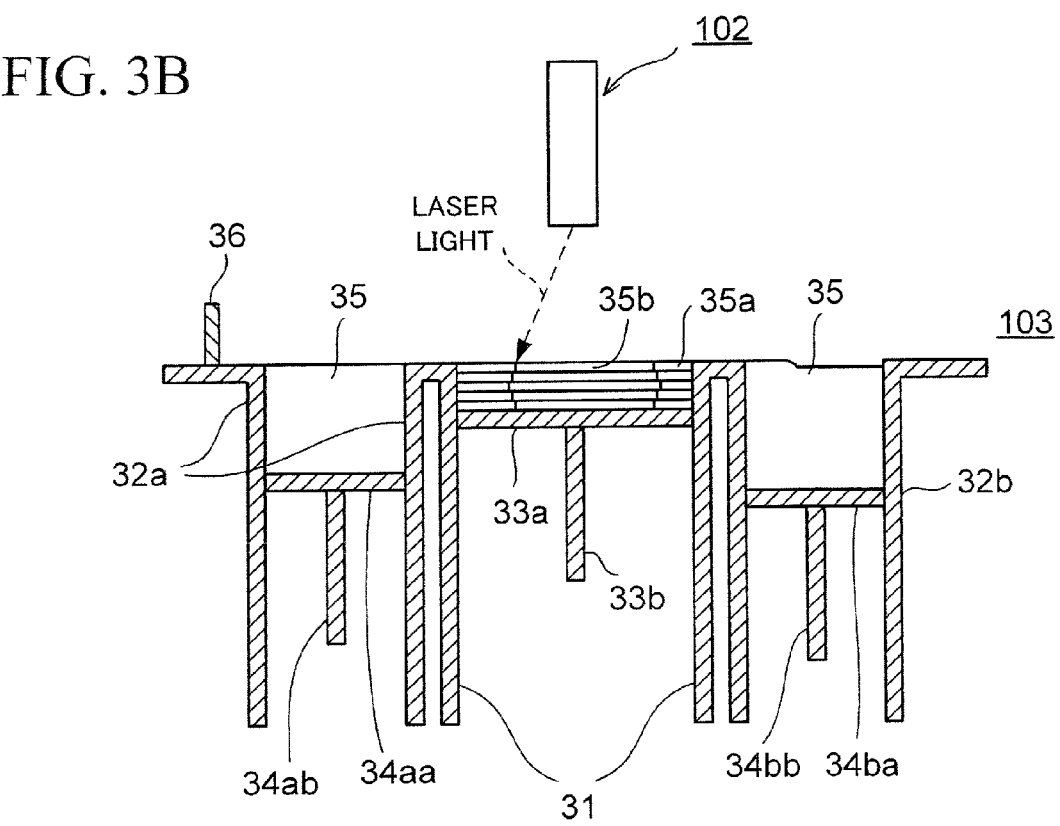
FIG. 3B is a view illustrating a cross section along I-I line of FIG. 3A and a laser light outputting section positioned above the thin layer forming section.

FIG. 3A is a top plan view illustrating the constitution of the thin layer forming section 103. FIG. 3B is a cross-sectional view along I-I line of FIG. 3A, and the drawing illustrates also the laser light outputting section 102 positioned above the thin layer forming section 103 in addition to the thin layer forming section 103. The chamber is omitted in FIGS. 3A, 3B.

The thin layer forming section 103, as illustrated in FIGS. 3A, 3B, is equipped with a thin layer forming container 31 in which modeling is performed by irradiation of laser light and first and second powder material housing containers 32a, 32b installed on the both sides of the thin layer forming container 31. To prevent oxidization or nitridation of the powder material, the thin layer forming section 103 is installed in the decompressable chamber 101.

Furthermore, the thin layer forming container 31, the first and second powder material housing containers 32a, 32b have a heater, a light source for heating, or other heating means (not illustrated) for heating powder material housed in each container 31, 32a, 32b or thin layers of the material. The heating means may be built in each container 31, 32a, 32b, or may be provided at the periphery of each container 31, 32a, 32b.

In the thin layer forming container 31, thin layers of a powder material 35a are formed on a part table (second elevating table) 33a, and then are sintered by irradiation of laser light to form sintered thin layers 35b. Then, the part table 33a is sequentially moved downward to stack the sintered thin layers 35b, and a three-dimensional model is thus fabricated.

In the first and second powder material housing containers 32a, 32b, a powder material 35 is housed on first and second feed tables (first and third elevating tables) 34aa and 34ba. In the case where either one of the first and second powder material housing containers 32a, 32b is a supply side, the other one is a housing side where residual powder material is housed after forming the thin layers of powder material.

Support shafts 33b, 34ab and 34bb are attached to the part table 33a and the feed tables 34aa, 34ba respectively. The support shafts 33b, 34ab and 34bb are connected to a driver unit (not illustrated) which vertically moves the support shafts 33b, 34ab and 34bb.

The driver unit is controlled by a control signal from the control section 104. The driver unit elevates the feed table 34aa or 34ba on the supply side of the powder material to supply the powder material 35, and lowers the feed table 34ba or 34aa on the housing side to house the powder material 35 which is left after forming the thin layer.

Furthermore, a recoater 36 which moves across the entire region on the top surface of the thin layer forming container 31 and the first and second powder material housing containers 32a, 32b is provided. The recoater 36 scrapes the powder material, which is projected on the top surface of the powder material housing container 32a or 32b due to elevation of the feed table 34aa or 34ba on the supply side of the powder material, while smoothening the surface, carries the scraped material to a thin layer forming region, and houses the powder material on the part table 33a while smoothening the surface to form a thin layer of the powder material 35a. The thickness of the thin layer of the powder material 35a is determined by a lowered amount of the part table 33a. Then, the recoater carries powder material which is left after forming the thin layer of the powder material to the powder material housing container 32b or 32a on the housing side, and houses it on the feed table 34ba or 34aa.

The aforementioned movement of the recoater 36 is controlled by a control signal from the control section 104.

(Powder Material)

The following metal powder is exemplified as a usable powder material 35.

As the metal powder, aluminum (Al), aluminum alloy, or a mixture of at least either one of aluminum and aluminum alloy and other metal is exemplified.

As the aluminum alloy, there is aluminum (Al) containing at least one type of Si, Mg, Cu, Mn, or Zn for example. Further, as the mixture of at least either one of aluminum and aluminum alloy and other metal, there is alloy formed by mixing at least one type selected from a group which consists of Mg, Cu, Ni, $Cu_3P$, and CuSn to at least one of aluminum (Al) and aluminum alloy at an appropriate ratio. Mg is for using a reducing action, and Ni is for improving wettability.

Although an average particle diameter of powder material is not particularly limited, it may be a size by which flowability can be maintained. Otherwise, aggregability of powder becomes stronger, and thus it becomes difficult to form a thinner thin layer of powder material.

As the metal powder, other than aluminum or aluminum alloy, metal powder of titanium or magnesium, tungsten, molybdenum, stainless steel, cobalt-chromium, Inconel or the like can be used. In addition, the present invention is applicable to metal powder sensitive to oxygen or nitrogen.

Further, as the powder material 35, a material formed by mixing laser absorber such as metal, pigment and dye into the above-described metal powder may be used. The metal, pigment and dye are selected from the kinds which are capable of absorbing laser light having a particular wavelength to be used.

Note that the present invention is also applicable to resin powder, and thereby oxygen, nitrogen and water can be removed from the resin powder in case of being used for modeling. This can prevent composition purity of the powder material from being deteriorated, so that recycling efficiency of the powder material is improved, and generation of orange peel can be suppressed. Furthermore, this can prevent heating energy from being deprived by water or the like, and thus energy can be effectively consumed for heating powder particles.

(iii) Constitution and Function of the Control Section

The control section 104 is constituted of a controller of the laser light outputting section 102 and a controller of the thin layer forming section 103

(Controller of Laser Light Outputting Section 102)

The controller of the laser light outputting section 102 sends a control signal to the XYZ driver, and performs the following control.

Specifically, laser light is scanned while the angles of the X mirror 21a and the Y mirror 21b are changed based on scanning line set to a sinter region, and the laser light source 23 is turned ON/OFF appropriately. During this action, the lens is moved constantly with the movement of laser light such that laser light focuses on the surface of the thin layer of powder material. The thin layer of powder material in the sinter region is sintered in this manner. Alternatively, the thin layer of powder material in the sinter region is melted, and solidified after that.

Note that various types of setting methods of scanning line are possible based on sliced data (drawing pattern) of a three-dimensional model to be fabricated.

For example, in the case of a square sinter region, a first scanning line is set so as to be directed obliquely downward from the left edge of the upper edge to the right edge of the sinter region, and then a second scanning line is set so as to be directed in a horizontal direction from the right edge to the left edge by using the endpoint of the first scanning line as a starting point. Next, by using the endpoint of the second scanning line as a starting point, the above-described setting method of the scanning line is repeated, and the scanning line is set all the way up to the lower edge of the sinter region. Furthermore, the scanning line is set along with the peripheral edge (boundary) of the sinter region. For the setting of the scanning line along with the peripheral edge, the laser light source is controlled such that an ON state is maintained from the start to the end of scanning.

By scanning laser light along with the scanning line above, one thin layer of the entire sinter region is sintered or melted and then solidified, and thus modeling is performed.

(Controller of the Thin Layer Forming Section 103)

A controller of the thin layer forming section 103 controls up and down of the part table 33a and the first and second feed tables 34aa, 34ba, and also the movement of the recoater 36, and controls heating by a heater.

(a) Control Method of Removing Oxygen, Nitrogen and Water from Powder Material Before Performing Rapid Prototyping In the case of housing the powder material into the first and second powder material housing containers 32a, 32b in the chamber 101, the inside of the chamber 101 is decompressed after the material is housed into the containers in the atmosphere, and thereby air (mainly oxygen, nitrogen and water) is removed from the powder material. However, the powder material in the lower areas of the containers 32a, 32b is not exposed to the decompressed atmosphere, and thus oxygen, nitrogen and water are residual in the powder material. The oxygen, nitrogen and water cannot be easily removed even if a peripheral area of the containers 32a, 32b is decompressed.

In this control, the powder material 35 is transferred by using the three containers, which are the thin layer forming container 31 and the first and second powder material housing containers 32a, 32b, and thereby air is removed from the powder material 35. Such control will be explained referring to FIGS. 4A to 4F.

Figure 4A:
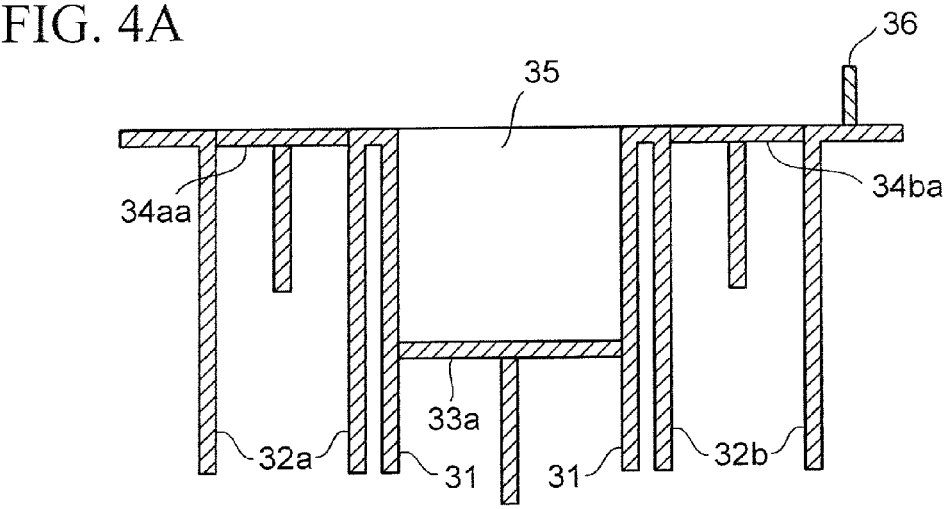
FIGS. 4A to 4N are cross-sectional views illustrating a control method of the powder rapid prototyping according to an embodiment.

FIG. 4A illustrates a state where the inside of the chamber 101 is decompressed after the powder material 35 is housed into the thin layer forming container 31 in the atmosphere. An amount of the powder material 35 to be housed in the thin layer forming container 31 is an amount that includes an amount overflowed when forming the thin layer of the powder material in addition to an amount enough for modeling.

In the decompressed state, the heating means for the thin layer forming container 31 is turned ON to heat the powder material 35. Heating temperature is maintained at a level where separation of oxygen, nitrogen and water in air is prompted. By sufficiently exposing the powder material to a decompressed atmosphere while heating the material, oxygen, nitrogen and water are removed from the surface of the powder material 35 and a portion a little inside the surface. Note that heating may be not performed in some cases. Further, the heating means for the first and second powder material housing containers 32a, 32b may be turned ON to heat the powder material housed in the containers 32a, 32b.

Figure 4B:
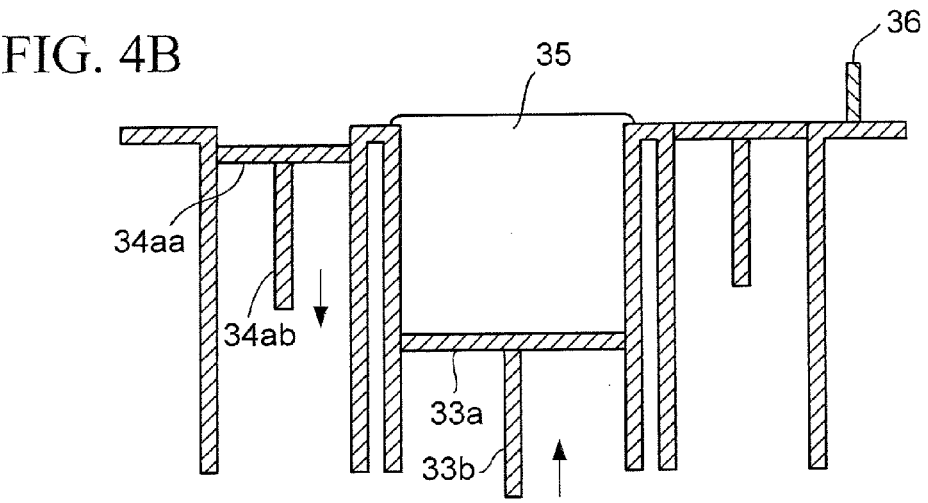

First, as illustrated in FIG. 4B, after the recoater 36 is positioned at the outer edge portion on the top surface of the second powder material housing container 32b, the part table 33a is elevated by the driver unit via the support shaft 33b, and the first feed table 34aa is lowered via the support shaft 34ab.

Consequently, a small amount of the powder material 35 is project on the top surface of the thin layer forming container 31. Note that a lowered amount of the first feed table 34aa is set a little deeper than a depth at which all of the projected powder material 35 can be housed on the first feed table 34aa without leaving it.

Although oxygen, nitrogen and water are sufficiently removed from a small amount of the powder material 35 projected on the top surface of the thin layer forming container 31, even more oxygen, nitrogen and water are sufficiently removed from the small amount of the projected powder material 35 by further leaving the material to stand for a certain period of time.

Figure 4C:
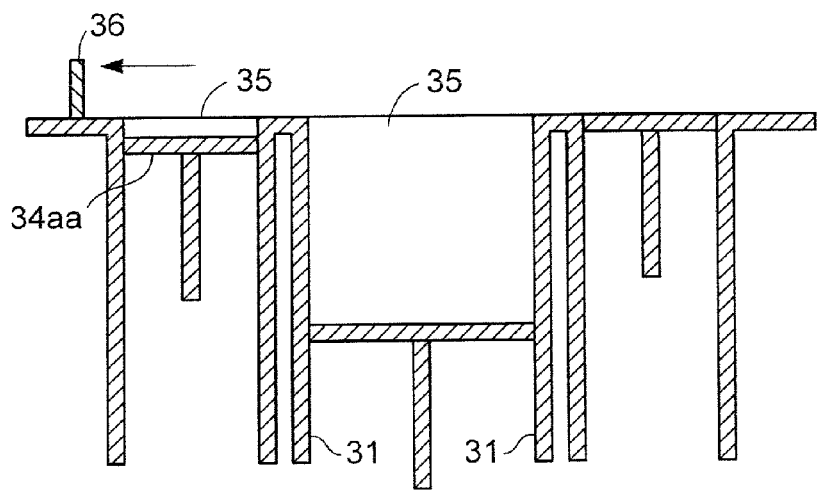

Next, as illustrated in FIG. 4C, the recoater 36 is moved to the left to scrape the projected powder material 35 while smoothening the surface. Furthermore, the recoater 36 is moved to the left to carry the powder material 35 to the first powder material housing container 32a and house it on the first feed table 34aa.

Next, while heating the powder material 35 in the thin layer forming container 31, the surface layer of the material is sufficiently exposed to a decompressed atmosphere to remove oxygen, nitrogen and water from the surface layer of the powder material 35.

Figure 4D:
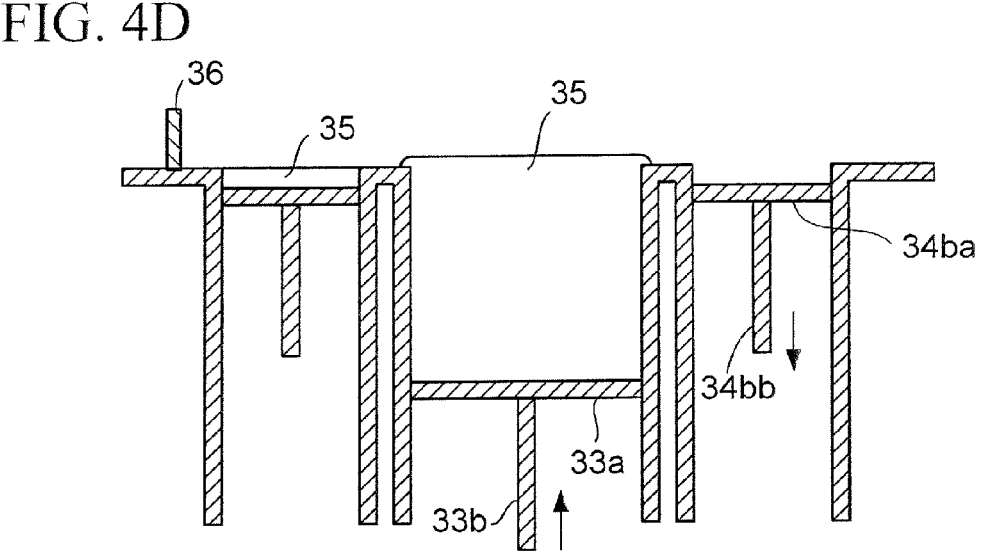

Next, as illustrated in FIG. 4D, the part table 33a is elevated by the driver unit via the support shaft 33b, the powder material 35 is projected on the top surface of the thin layer forming container 31 and the second feed table 34ba is lowered via the support shaft 34bb. Oxygen, nitrogen and water have been already sufficiently removed from a small amount of the projected powder material 35.

Figure 4E:
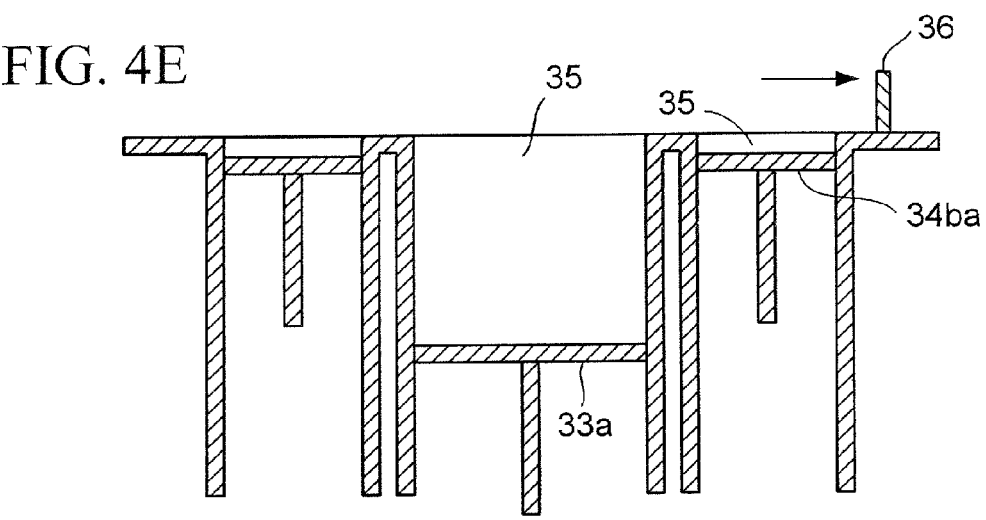

Next, as illustrated in FIG. 4E, the recoater 36 is moved to the right to scrape the powder material 35 which is projected on the top surface of the thin layer forming container 31. Then, the material is carried to the second powder material housing container 32b to house the material on the second feed table 34ba.

Figure 4F:
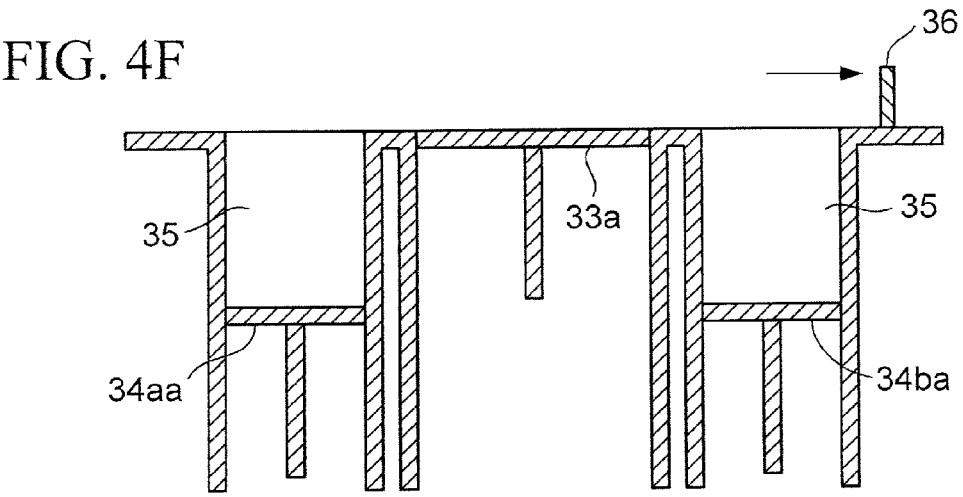

The above-described control is repeated until all the powder material 35 is transferred from the thin layer forming container 31 to the first powder material housing container 32a and the second powder material housing container 32b. FIG. 4F illustrates the state where transfer of the powder material 35 ended.

As described above, in transferring the material from the thin layer forming container 31 to the first and second powder material housing containers 32a, 32b, the powder material 35 is exposed to a decompressed atmosphere while being heated and then the surface layer of the powder material 35 from which oxygen, nitrogen and water have been sufficiently removed is scraped to transfer it. Specifically, the powder material 35 is divided and transferred by a small amount. Consequently, the powder material 35 transferred to the first and second powder material housing containers 32a, 32b contains almost no air.

Note that the above-described control of removing oxygen, nitrogen and water from the powder material is performed such that the material is first transferred from the thin layer forming container 31 to the first powder material housing container 32a, and then transferred to the second powder material housing container 32b. However, on the contrary to the above, the control may be performed such that the material is first transferred to the second powder material housing container 32b, and then transferred to the first powder material housing container 32a.

Further, the control may also be performed such that the material is transferred to either one of the first and second powder material housing containers 32a, 32b.

Further, in the case where resin powder is used as the powder material, it is necessary to control heating temperature to be maintained at a level where separation of oxygen, nitrogen and water in the resin powder is prompted, and it needs to be controlled at temperature where the resin powder does not melt at highest.

(b) Control Method of Powder Rapid Prototyping

Next, referring to FIGS. 4G to 4N, description will be made for the control for performing rapid prototyping after transferring the powder material as described above.

Figure 4G:
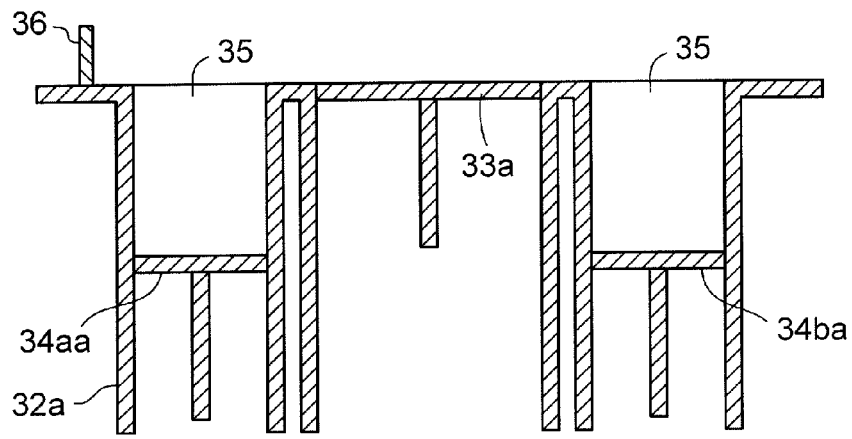

The controller of the thin layer forming section 103, as illustrated in FIG. 4G, positions the recoater 36 at the outer edge portion of the first powder material housing container 32a first.

Figure 4H:
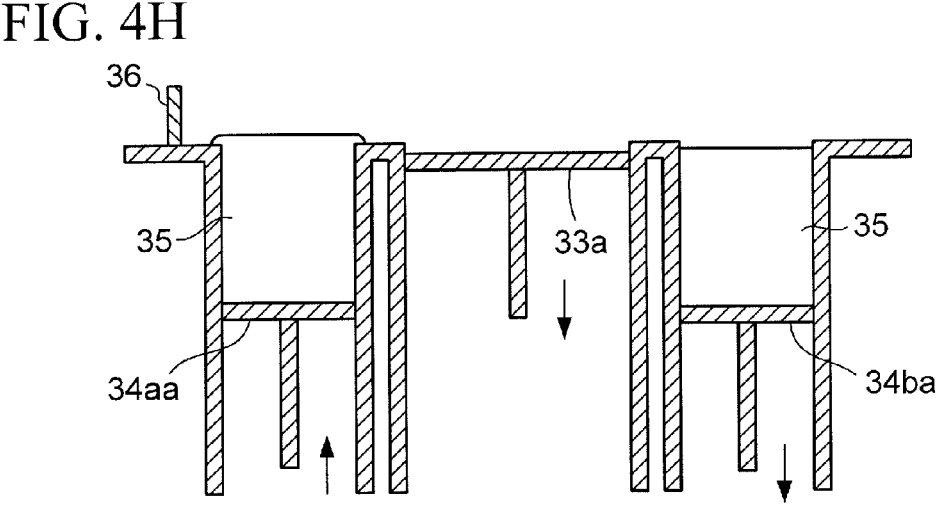

Next, as illustrated in FIG. 4H, the first feed table 34aa mounting the powder material 35 thereon is elevated and the part table 33a is lowered by an amount equivalent to one thin layer. Further, the second feed table 34ba is lowered to a level where the powder material left after forming the thin layer is sufficiently housed.

Figure 4I:
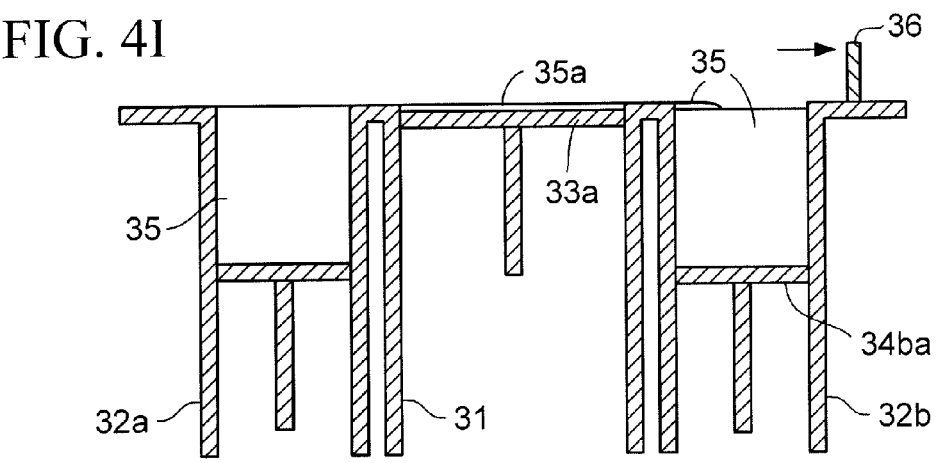

Next, as illustrated in FIG. 4I, the recoater 36 is moved to the right to carry the powder material 35 from the first powder material housing container 32a to the thin layer forming container 31. Then, the powder material 35 is housed into the thin layer forming container 31 while smoothening the surface to form the thin layer 35a of the powder material on the part table 33a. The residual powder material 35 is carried to the second powder material housing container 32b by moving the recoater 36 further to the right, and housed on the second feed table 34ba.

Figure 4J:
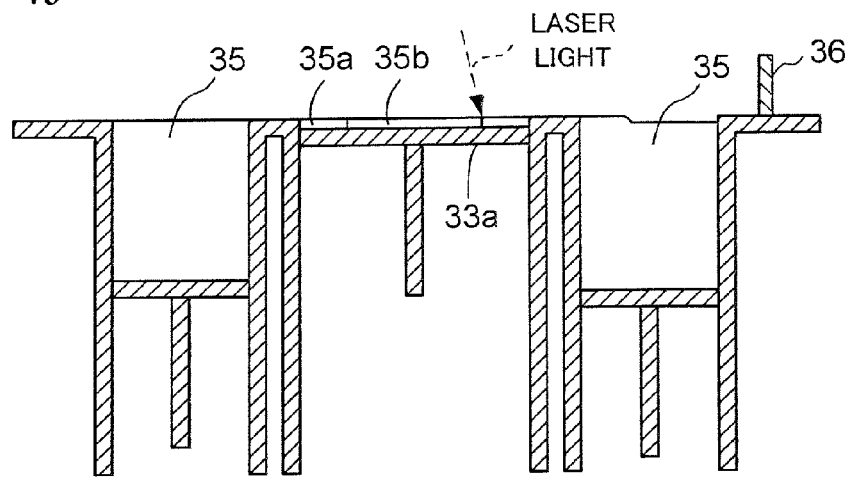

After that, as illustrated in FIG. 4J, based on sliced data (drawing pattern) of a three-dimensional model to be fabricated, laser light is irradiated while the movement of the mirrors 21a, 21b and the lenses of the optical systems 21, 22 is controlled by the controller of the laser light outputting section 102, and thus the thin layer 35a of the powder material is selectively heated to form the sintered thin layer 35b.

Figure 4K:
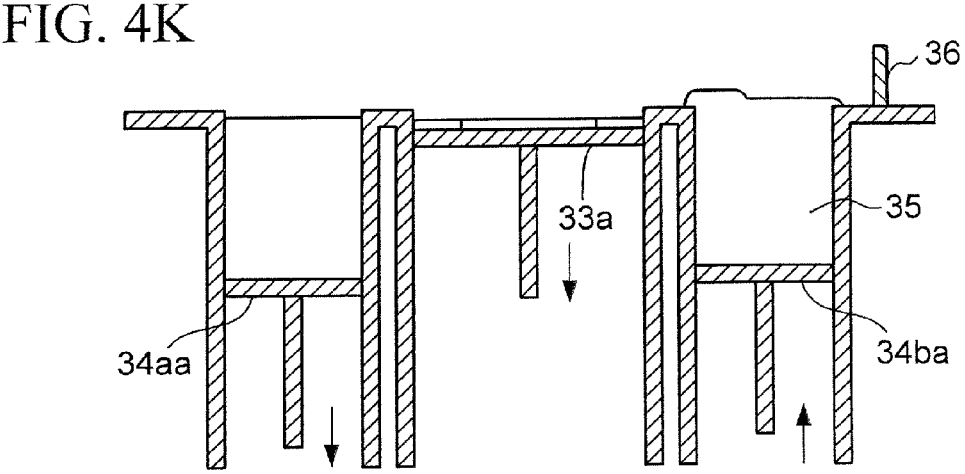

Next, as illustrated in FIG. 4K, the second feed table 34ba mounting the powder material 35 thereon is elevated and the part table 33a is lowered by an amount equivalent to one thin layer. Further, the first feed table 34aa is lowered to a level where the powder material 35 residual after forming the thin layer is sufficiently housed.

Figure 4L:
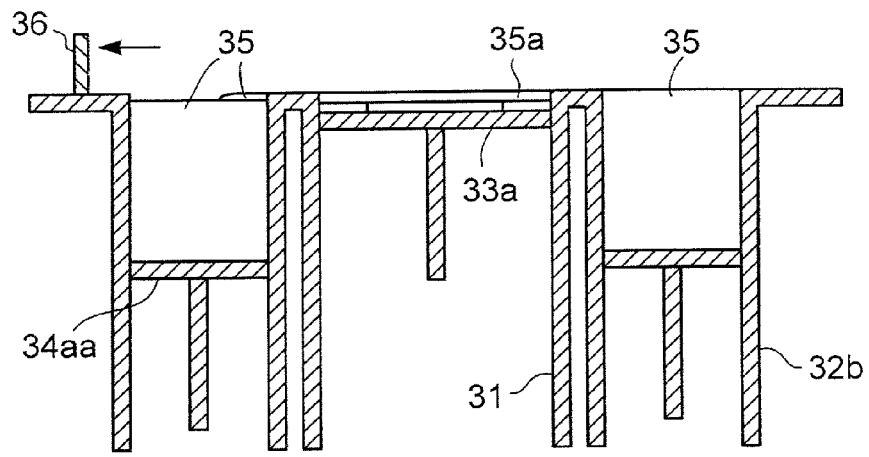

Next, as illustrated in FIG. 4L, the recoater 36 is moved to the left to carry the powder material 35 from the second powder material housing container 32b to the thin layer forming container 31. Then, the powder material is housed into the thin layer forming container 31 while smoothening the surface to form the thin layer 35a of the powder material on the sintered thin layer 35b of the part table 33a. The residual powder material 35 is carried to the first powder material housing container 32a by moving the recoater 36 further to the left, and housed on the first feed table 34aa.

Figure 4M:
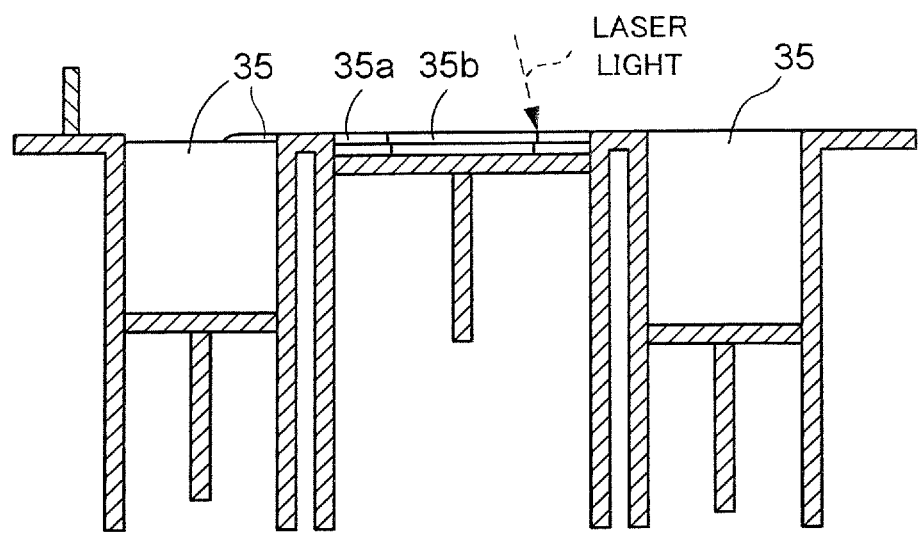

After that, as illustrated in FIG. 4M, based on the sliced data, laser light is irradiated while the movement of the mirrors 21a, 21b and the lens of the optical system is controlled by a controller 25 of the laser light outputting section 102. Then, the thin layer 35a of the powder material is selectively heated to form a new sintered thin layer 35b on the sintered thin layer 35b.

Figure 4N:
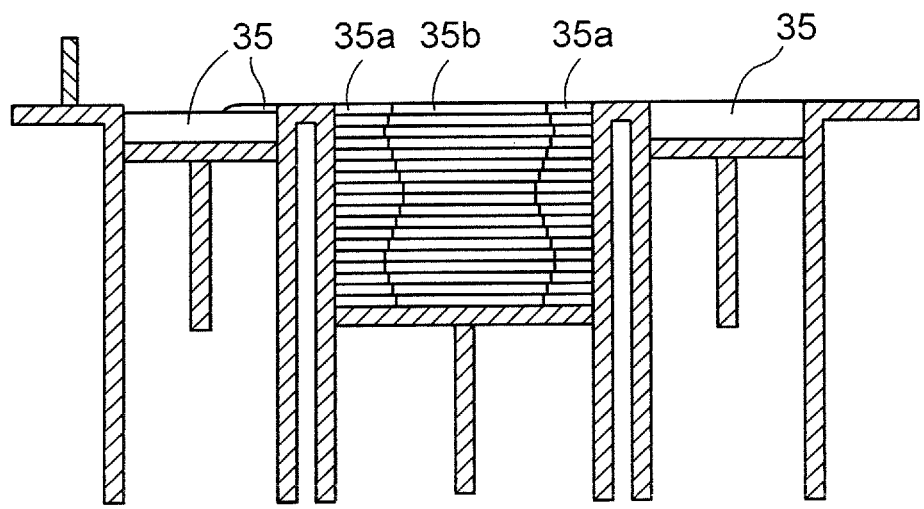

Subsequently, forming of the thin layer 35a of the powder material→forming of the sintered thin layer 35b→forming of the thin layer 35a of the powder material→forming of the sintered thin layer 35b→and so on are repeated, and thereby a plurality of the sintered thin layers 35b are laminated to fabricate a three-dimensional model. FIG. 4N illustrates a state after the modeling of a three-dimensional model ended.

Note that the controller may control the heating means for each container 31, 32a, 32b such that temperature of the powder material is maintained a little lower than sintering temperature or melting temperature during performing rapid prototyping.

According to the rapid prototyping apparatus of the embodiment of the present invention explained above, the powder material that does not contain oxygen, nitrogen and water can be easily obtained.

Furthermore, by using the powder material for modeling, inconvenience which occurs due to oxygen, nitrogen and water contained in the powder material is further suppressed in sintering or melting and then solidifying the powder material.

(2) Explanation of a Powder Rapid Prototyping Method

Next, referring to FIGS. 1 to 4, a powder rapid prototyping method using the above-described powder rapid prototyping apparatus will be explained. This rapid prototyping method includes a method of removing oxygen, nitrogen and water from the powder material before performing rapid prototyping.

(a) Method of Removing Oxygen, Nitrogen and Water from Powder Material Before Performing Rapid Prototyping First, as illustrated in FIG. 4A, the powder material 35 of at least an amount required for modeling is housed into the thin layer forming container 31 in the atmosphere.

After that, as in FIGS. 4B to 4F, the powder material is divided while being exposed to a decompressed atmosphere and is transferred. Since the transfer is performed according to the above-described "Control method of removing oxygen, nitrogen and water from the powder material before performing rapid prototyping", details are omitted.

Since oxygen, nitrogen and water is sufficiently removed from the powder material 35 due to the transfer, oxygen, nitrogen and water are not contained in the powder material 35 used for modeling, which is housed in the first and second powder material housing containers 32a, 32b.

(b) Method of Performing Rapid Prototyping

Next, rapid prototyping is performed as in FIGS. 4G to 4N by using the powder material transferred to the first and second powder material housing containers 32a, 32b. Rapid prototyping may be performed subsequently in a decompressed atmosphere after removing oxygen, nitrogen and water from the powder material in a decompressed atmosphere, or may be performed in an inert gas atmosphere (such as argon atmosphere) with which a decompressed atmosphere is substituted.

Since the rapid prototyping is performed according to the "Control method of rapid prototyping", details are omitted.

Note that the three-dimensional model which has been completed by stacking the sintered thin layer 35b is buried in powder material in the thin film forming container 31, so the model is taken out after removing the powder material.

Further, in the method of performing rapid prototyping, preliminary heating of the powder material or the thin layer is performed during modeling by the heating means for each container 31, 32a, 32b in order to maintain temperature a little lower than the sintering temperature or the melting temperature of the powder material. Thereby, sintering or the like is performed quickly and certainly, and thermal strain of the model can be made smaller.

According to the rapid prototyping method of this embodiment, powder material that does not contain oxygen, nitrogen and water can be easily obtained.

Furthermore, since modeling is performed by using the powder material, a practical prototype or a product whose strength is further improved can be fabricated by direct sintering, and a model with smoothly finished surface can be obtained. Further, recycling efficiency of the powder material residual after modeling can be increased.

(3) First Modified Example

Description will be made for a controller of a thin layer forming section according to a first modified example which is applicable to the powder rapid prototyping apparatus of FIG. 3, referring to FIG. 5 which explains the control method of the controller.

In the control method, control is performed as follows different from that as in FIGS. 4A to 4F, in which all powder material is housed on the part table first, and control is performed such that the powder material is transferred on the first and second feed tables.

Figure 5A:
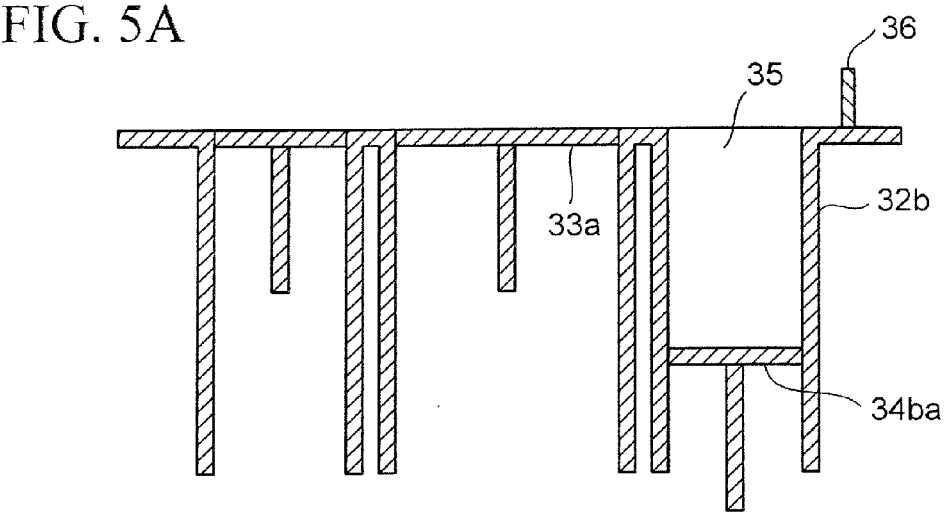
FIGS. 5A to 5F are cross-sectional views illustrating a control method of the powder rapid prototyping according to a first modified example.

First, all powder material 35 is housed on the second feed table 34ba of the first and second feed tables 34aa, 34ba (FIG. 5A).

Figure 5B:
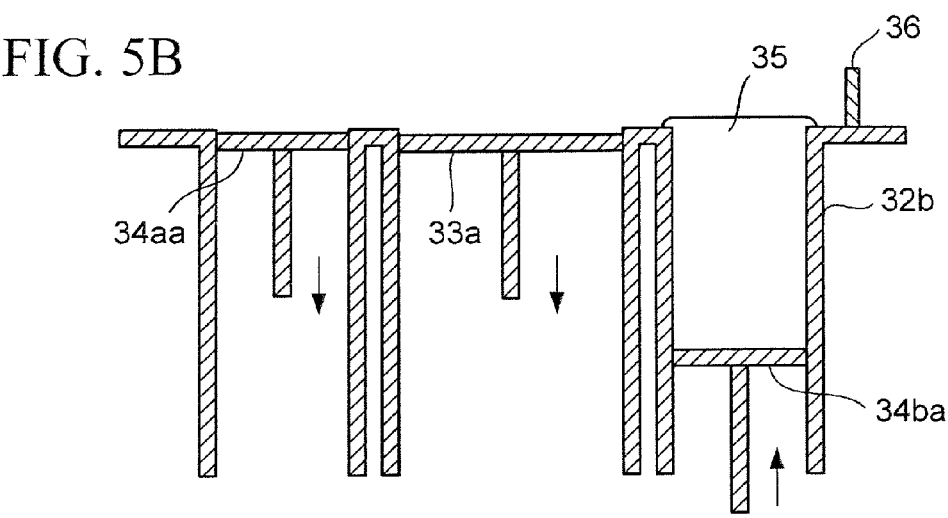
Figure 5C:
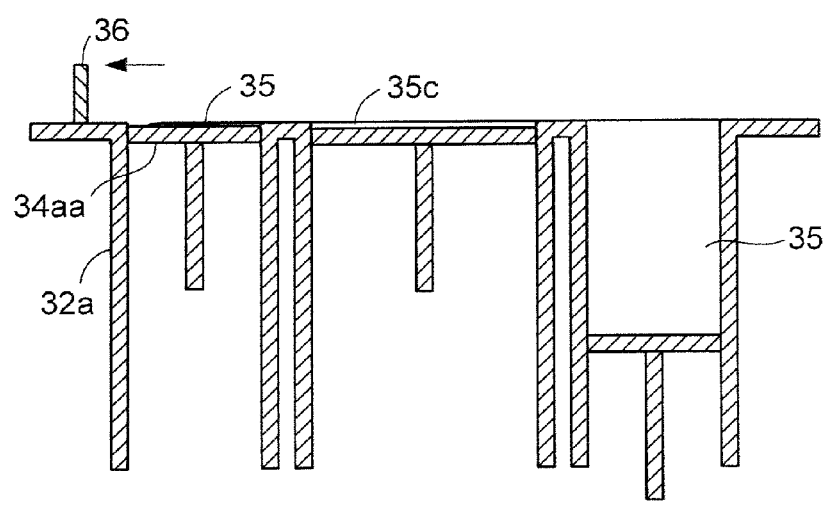
Figure 5D:
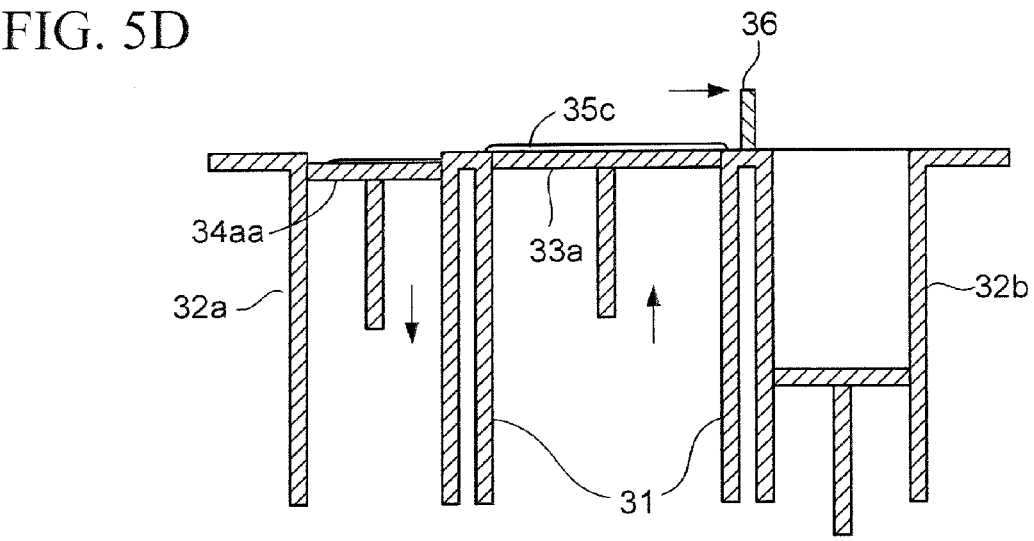
Figure 5E:
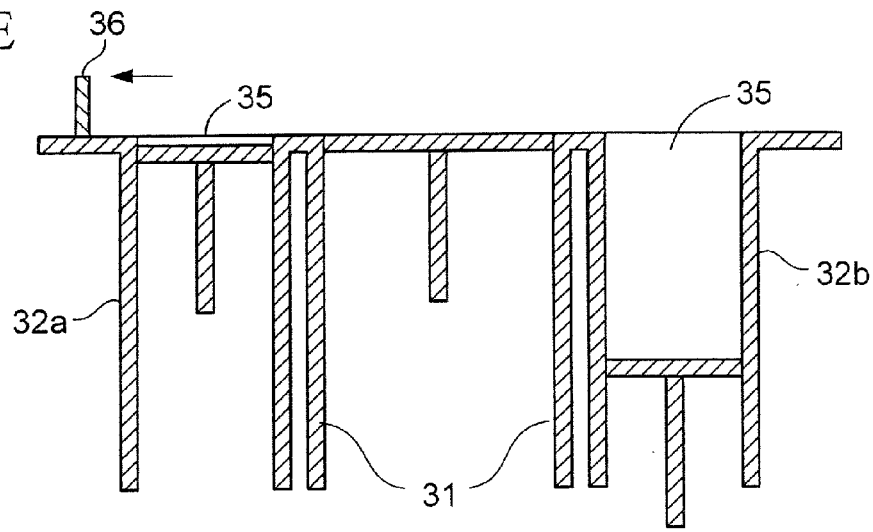
Figure 5F:
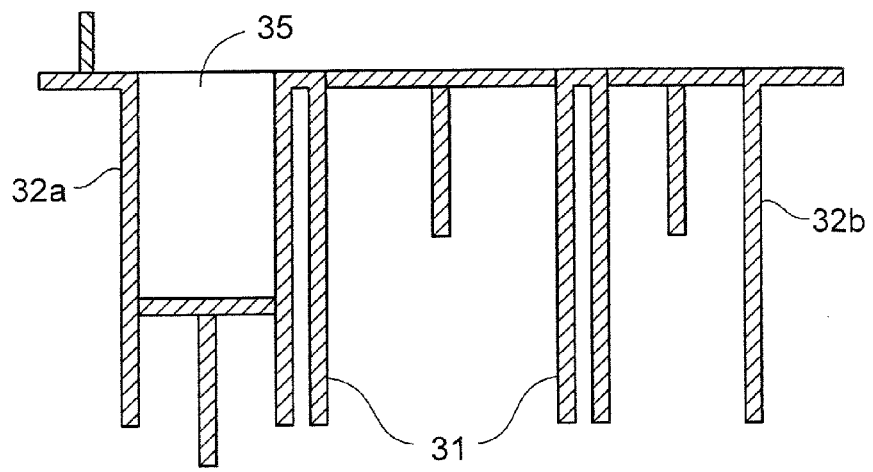

Next, the material is transferred on the first feed table 34aa (FIGS. 5E, 5F) from the second feed table 34ba by a small amount via the part table 33a (FIGS. 5B, 5C, 5D).

Then, in the middle of transfer, a thin layer 35c of powder material is formed on the part table 33a (FIG. 5B) and in this state, the layer is sufficiently exposed to a decompressed atmosphere. Thereby, oxygen, nitrogen and water are removed from the thin layer of powder material 35c.

Figure 6A:
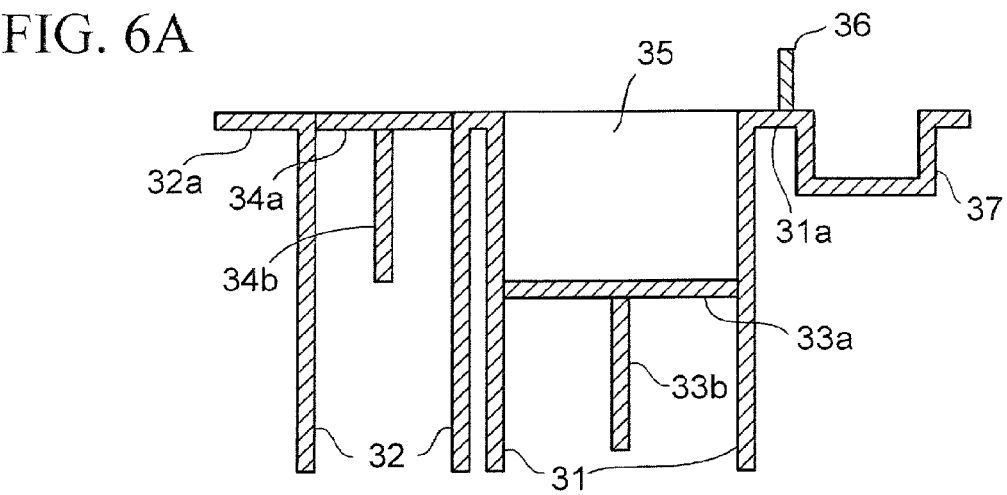
FIGS. 6A to 6F are cross-sectional views illustrating a control method of the powder rapid prototyping according to a second modified example.
Figure 6B:
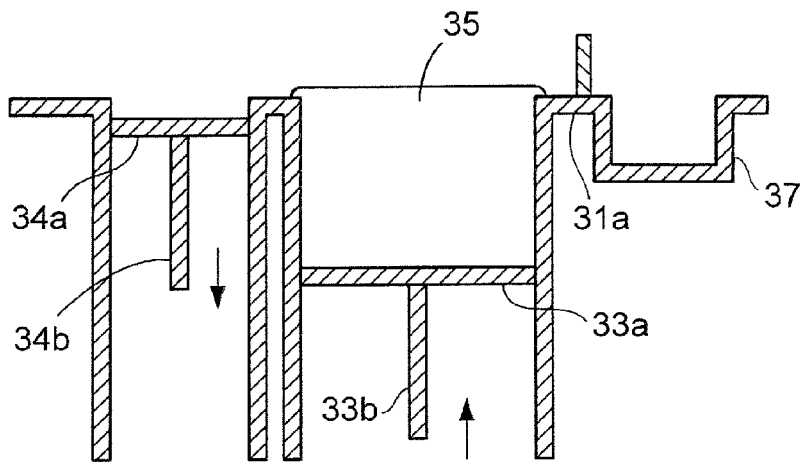
Figure 6C:
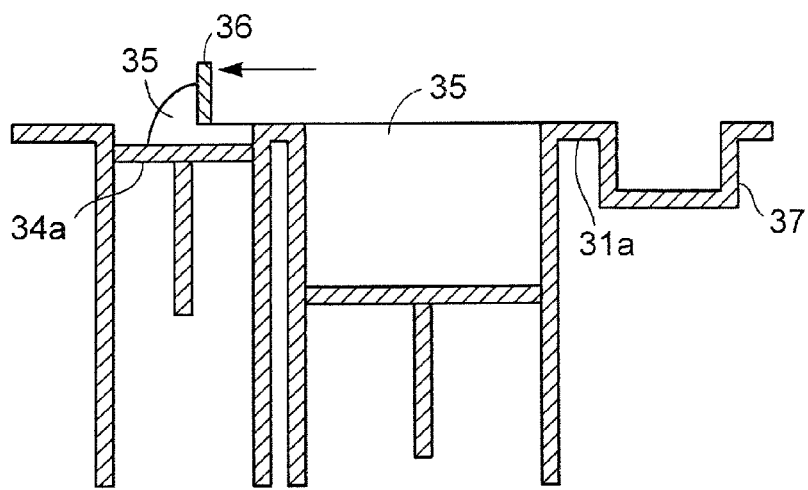
Figure 6D:
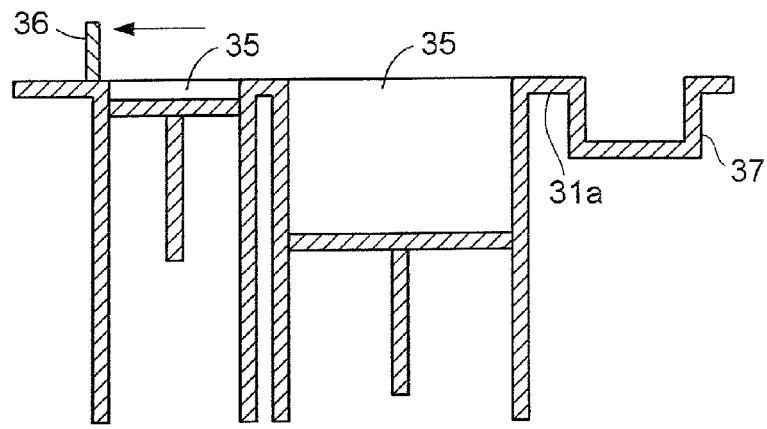
Figure 6E:
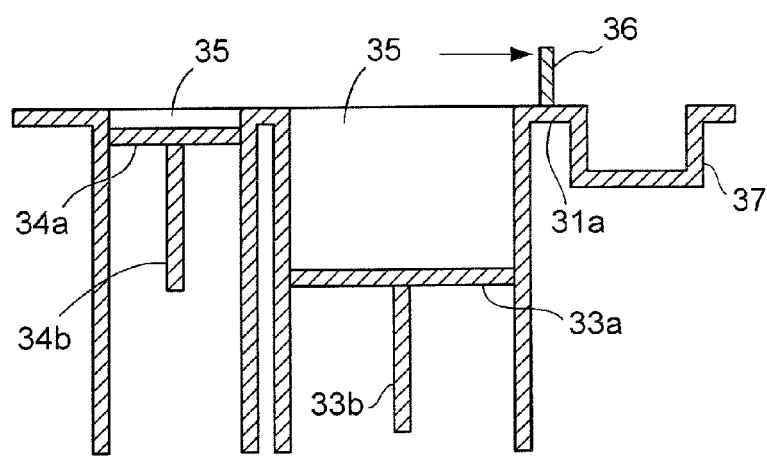
Figure 6F:
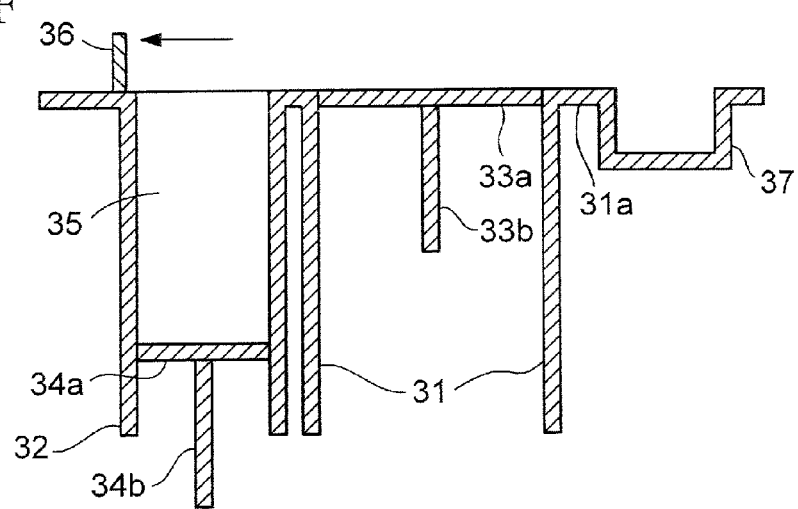

(4) Second Modified Example (i) Constitution of the Thin Layer Forming Section According to the Second Modified Example FIG. 6F is a cross-sectional view explaining the constitution of the thin layer forming section according to the second modified example out of the powder rapid prototyping apparatus of FIG. 1.

Only one powder material housing container 32 is provided for the thin layer forming section of the second modified example.

In FIG. 6F, reference numeral 32 denotes a powder material housing container corresponding to the first or second powder material housing container 32a, 32b of FIG. 3B, reference numeral 34a denotes a feed table corresponding to the first or second feed tables 34aa, 34ba of FIG. 3B, and reference numeral 34b denotes a support shaft corresponding to the support shafts 34ab, 34bb of FIG. 3B. Further, reference numeral 37 denotes a storage container that houses residual powder material after forming the thin layer of powder material on the part table 33a during modeling.

By the control of the driver unit due to the control section 104, the feed table 34a goes up/down via the support shaft 34b.

Additionally, items indicated with the same reference numerals as those in FIGS. 3, 4A to 4F are the same as the items in FIGS. 3, 4A to 4F.

(ii) Controller of the Thin Layer Forming Section According to the Second Modified Example The controller of the thin layer forming section controls up and down of the part table 33a and the feed table 34a, the movement of the recoater 36, and heating of the thin layer forming container 31 and powder material housing container 32 by the heating means.

(a) Control Method of Removing Oxygen, Nitrogen and Water from Powder Material Before Performing Rapid Prototyping Referring to FIGS. 6A to 6F, a control method of removing oxygen, nitrogen and water from the powder material of the thin layer forming section will be explained.

In the control method, first, the powder material 35 is housed in the thin layer forming container 31 in the atmosphere, and then the inside of the chamber 101 is decompressed. FIG. 6A illustrates such state. In this state, the powder material 35 is held for appropriate time so as to be exposed sufficiently to a decompressed atmosphere while being heated, and thereby oxygen, nitrogen and water are removed from the surface layer of the powder material 35. Note that heating may be omitted in some cases.

Next, as illustrated in FIG. 6B, the recoater 36 is positioned at the outer edge portion on the top surface of the thin layer forming container 31, and then the part table 33a is elevated via the support shaft 33b by the driver unit and the feed table 34a is lowered via the support shaft 34b.

Consequently, the powder material 35 is projected on the top surface of the thin layer forming container 31. Oxygen, nitrogen and water have been sufficiently removed from the projected powder material 35.

Next, as illustrated in FIGS. 6C, 6D, the recoater 36 is moved to the left to scrape the projected powder material 35 while smoothening the surface. Furthermore, the recoater 36 is moved to the left to carry the powder material 35 to the powder material housing container 32, and the material is housed on the feed table 34a while smoothening the surface.

Next, while the powder material 35 in the thin layer forming container 31 is heated, the surface of the material is sufficiently exposed to a decompressed atmosphere to remove oxygen, nitrogen and water from the surface layer 35 of the powder material. Next, as illustrated in FIG. 6E, the recoater 36 is moved to the right and positioned at the outer edge portion on the top surface of the thin layer forming container 31.

The above-described control is repeated until all the powder material 35 is transferred from the thin layer forming container 31 to the powder material housing container 32. FIG. 6F illustrates the state where transfer of the powder material 35 ended.

As described above, in transferring the material from the thin layer forming container 31 to the powder material housing container 32, the surface layer of the powder material 35, from which oxygen, nitrogen and water have already been sufficiently removed by exposing it to a decompressed atmosphere while being heated, is scraped to transfer it. Specifically, the powder material 35 is divided and transferred by a small amount. Consequently, the powder material 35 transferred to the powder material housing container 32 contains almost no air.

(b) Control Method of Rapid Prototyping

In the control method of rapid prototyping, the recoater 36 carries the powder material of an amount slightly larger than an amount for forming a thin layer from the feed table 34a first, and forms the thin layer of powder material on the part table 33a. Residual powder material is housed in the storage container 37.

Next, laser light is irradiated to the thin layer of the powder material on the part table 33a to perform modeling.

The process to perform modeling is followed by repeating control of returning the recoater 36 to the original position, carrying the powder material 35 on the part table 33a again from the feed table 34a, forming the thin layer of powder material, and modeling it. Thereby, a desired three-dimensional model is fabricated.

As described above, oxygen, nitrogen and water are already removed from the powder material to be used for modeling in the second modified example as well. Thereby, a practical prototype or a product whose strength is further improved can be fabricated by direct sintering, a model with smoothly finished surface can be obtained, and further, recycling efficiency of powder material residual after modeling can be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A powder rapid prototyping apparatus, comprising:
   a decompressable chamber;
   a thin layer forming section which supplies powder material from a powder material housing container provided in the chamber to form a thin layer of the powder material;
   an energy beam source for heating which outputs energy beam for heating which sinters or melts, and models the thin layer of the powder material; and
   a control section which controls the modeling, wherein
   the control section exposes the powder material to the decompressed atmosphere before starting modeling, and houses the powder material in the powder material housing containers in a divided manner.

2. The powder rapid prototyping apparatus according to claim 1, wherein
   the powder material housing container equipped with a first elevating table and a thin layer forming container equipped with a second elevating table are parallelly placed in the thin layer forming section, and the thin layer forming section has a recoater which moves on a top surface of the powder material housing container and the thin layer forming container to carry the powder material, and forms a thin layer of the powder material on the second elevating table, wherein
   control in which the control section exposes the powder material to the decompressed atmosphere before starting modeling and houses the powder material in the powder material housing containers in a divided manner is performed by transferring the powder material housed in the thin layer forming container in a divided manner to the powder material housing container in the decompressed atmosphere before starting modeling.

3. The powder rapid prototyping apparatus according to claim 2, wherein
   the transfer of the powder material is performed by:
   projecting the powder material on the top surface of the thin layer forming container by moving the second elevating table upward in the decompressed atmosphere;
   scraping the projected powder material by moving the recoater forward, carrying the scraped powder material to the powder material housing container; and housing the carried powder material on the first elevating table by moving the first elevating table downward.

4. The powder rapid prototyping apparatus according to claim 2, further comprising:

heating means for heating the powder material in the thin layer forming container.

5. The powder rapid prototyping apparatus according to claim 2, further comprising:

heating means for heating the powder material in the power material housing container.

6. The powder rapid prototyping apparatus according to claim 1, wherein a first powder material housing container equipped with a first elevating table, a thin layer forming container equipped with a second elevating table and a second powder material housing container equipped with a third elevating table are parallelly placed in the thin layer forming section, and the thin layer forming section has a recoater which moves on a top surface of the first powder material housing container, the thin layer forming container and the second powder material housing container to carry the powder material, and forms a thin layer of the powder material on the second elevating table, control in which the control section exposes the powder material to the decompressed atmosphere before starting modeling and houses the powder material in the powder material housing containers in a divided manner is performed by transferring the powder material housed in the thin layer forming container in a divided manner to at least one container of the first powder material housing container and the second powder material housing container in the decompressed atmosphere before starting modeling.

7. The powder rapid prototyping apparatus according to claim 6, wherein the transfer of the powder material is performed by:

projecting the powder material on the top surface of the thin layer forming container by moving the second elevating table upward;

scraping the projected powder material by moving the recoater forward;

carrying the scraped powder material to the first powder material housing container; and housing the carried powder material on the first elevating table by moving the first elevating table downward.

8. The powder rapid prototyping apparatus according to claim 7, wherein after housing the powder material on the first elevating table, further comprising:

projecting the powder material on the top surface of the thin layer forming container by moving the second elevating table upward;

scraping the projected powder material by moving the recoater forward;

carrying the scraped powder material to the second powder material housing container; and housing the carried powder material on the third elevating table by moving the third elevating table downward.

9. The powder rapid prototyping apparatus according to claim 6, further comprising:

heating means for heating the powder material in the thin layer forming container.

10. The powder rapid prototyping apparatus according to claim 6, further comprising:

heating means for heating the powder material in the first and second powder material housing containers.

11. The powder rapid prototyping apparatus according to claim 1, wherein the powder material is metal powder.

12. The powder rapid prototyping apparatus according to claim 1, wherein the energy beam source for heating is a laser light source or an electron beam source.

13. A powder rapid prototyping method, comprising:

housing powder material in a decompressed atmosphere or in an inert gas atmosphere;

supplying the powder material to form a thin layer of the powder material; and sintering or melting and then solidifying the thin layer to model it, wherein the powder material is exposed to a decompressed atmosphere and housed in a divided manner before starting modeling.

14. The powder rapid prototyping method according to claim 13, wherein the exposing the powder material to a decompressed atmosphere and housing in a divided manner before starting the modeling includes exposing the powder material to a decompressed atmosphere while heating the material.

15. The powder rapid prototyping method according to claim 13, wherein the exposing said powder material to a decompressed atmosphere and housing in a divided manner before starting modeling includes scraping the surface layer of the powder material after exposing the powder material to the decompressed atmosphere, and then housing the scraped powder material.

16. The powder rapid prototyping method according to claim 13, wherein the exposing the powder material to a decompressed atmosphere and housing in a divided manner before starting modeling includes exposing the thin layer of the powder material to the decompressed atmosphere after dividing the powder material and forming the thin layer of the powder material, and then housing the powder material constituting the thin layer exposed to the decompressed atmosphere.

17. The powder rapid prototyping method according to claim 13, wherein the powder material is metal powder.

* * * * *